3,111,712
SPHERICAL CORE GUIDE
Domenico C. Frate, Baltimore, Md., assignor to Western Electric Company, Incorporated, New York, N.Y., a corporation of New York
Filed July 19, 1962, Ser. No. 210,961
3 Claims. (Cl. 18—13)

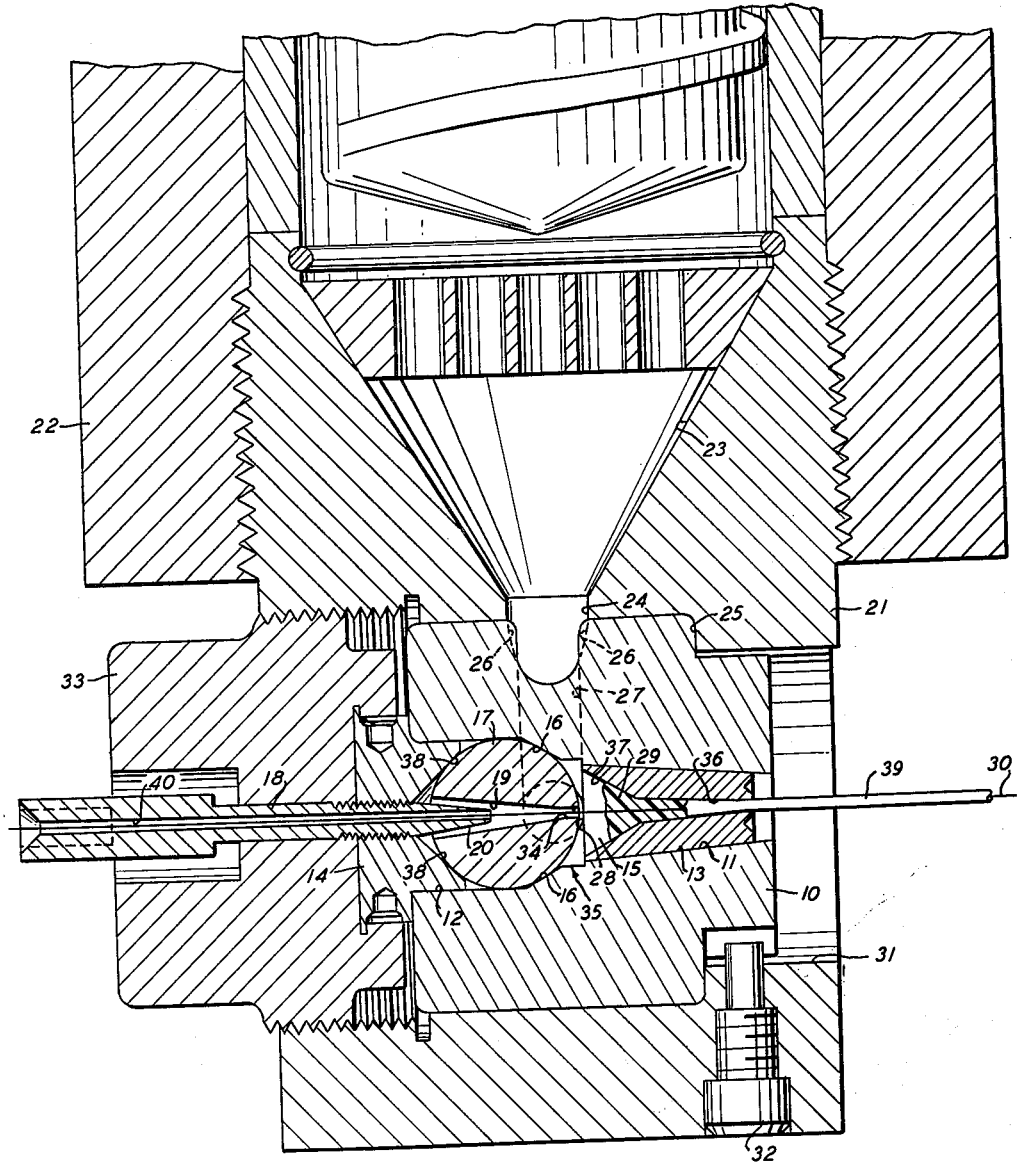

This invention relates to an extruding device and particularly to a capsule-type extruder tool having a universally pivotable core guide for preventing eccentricity of a core with respect to the orifice of an extrusion die.

In the operation of many extruding tools, difficulty is encountered in aligning a core guide with the orifice of an extrusion die. This is of particular concern where a high degree of concentricity of an insulating sheath with the core is required.

It is a prime object of this invention to provide facilities for aligning a core guide with the orifice of an extruding die.

A further object of this invention is to provide a universally rotatable core guide which will automatically compensate for eccentricity between the core guide and the orifice of an extrusion die.

Another object of this invention is to provide a core guide which, when adjusted to compensate for eccentricity between the core guide and the orifice of an extrusion die, will not affect the flow of the extrusion materials through an extrusion die.

With these and other objects in view, the present invention contemplates a capsule-type extruder tool having a core tube, a core guide and an extrusion die. The core guide is provided with a substantially spherical outer surface and a complementary socket for mounting the core guide on the tip of the core tube. A socket is provided in the capsule-type extruder tool for receiving the core tube and core guide and for mounting the core guide directly behind the orifice of the extruding die. As a core is advanced through the core tube, core guide and extruding die, the core guide will rotate on its socket mountings with the core tube and extruder tool to compensate for any eccentricity between the core guide and the orifice of the extruding die. The core guide rotates due to the pressure exerted on the core guide by the core as a result of eccentricity between the core guide and the orifice of the extrusion die.

Other objects, advantages and novel features of the invention will become apparent upon consideration of the following detailed description in conjunction with the accompanying drawing, wherein:

The drawing shows a full sectional view of a capsule-type extruder tool embodying the principal features of the invention.

Attention is now directed to the drawing wherein is disclosed a preferred embodiment of the present invention. A cylindrical adaptor 21 is threaded to a housing 22 of an extrusion material supplying unit (not shown) of the extruding apparatus. Adaptor 21 is provided with a transverse cylindrical bore 31 having a shoulder 25 and set screw 32 for retaining member 10 therein.

Member 10 is of a generally cylindrical shape having an interior bore, generally shown by 35, for receiving extrusion die 13, spherical core guide 17, core tube holder 14 and core tube 18. Aperture 11 of interior bore 35 of member 10 has a generally conical shape for retaining extrusion die 13 therein. The extrusion die 13 has a passageway 36 for forming extrusion material 29 about a core such as wire 30. Orifice 37 of extrusion die 13 is generally conical and is at the rear of extrusion die 13 for funnelling the extrusion material 29 into the die. Cylindrical aperture 12 of interior bore 35 receives the spherical core guide 17. A socket 16 is provided at the end of aperture 12 wherein the spherical core guide 17 will be free to rotate. A chamber 15 is formed between the core guide 17 and orifice 37 on the extrusion die 13 as will be noted in the drawings.

Retaining member 33 carries a core tube holder 14. Member 33 is threaded into adapter 21 and mates core tube holder 14 with the cylindrical aperture 12 of member 10. Core tube holder 14 is provided with a socket portion 38 for retaining the spherical core guide 17 within the cylindrical aperture 12. The spherical core guide 17 will therefore freely rotate in sockets 16 and 38 to compensate for any eccentricity between the spherical core guide 17 and the passageway 36 of extrusion die 13.

Spherical core guide 17 has a bore therein formed by a generally conical portion, socket 19, and a cylindrical aperture 34. Core tube 18 is threaded through retaining member 33 and core tube holder 14 so that conical tip 20 of the core tube 18 is inserted into socket 19 of the spherical core guide 17. Aperture 34 of the spherical core guide 17 acts to guide the core into the extrusion die 13. The spherical core guide 17 will rotate within sockets 16 and 38 of the interior bore 35 in order to compensate for any eccentricity between aperture 34 of the core guide and the bore of the extrusion die. It should be noted that socket 19 of the core guide 17 has a clearance which will permit the core guide sufficient freedom of movement on the tip 20 of core tube 18 so as not to interfere with the core guide 17 rotating in sockets 16 and 38. The core guide 17 will therefore have sufficient freedom of rotation about its center to compensate for any eccentricity between the core guide and the extruder die 13.

Adaptor 21 has a conical material supply passageway 23 ending in an outlet 24. The outlet 24 mates with entrance 26 of a passageway 27 of member 10. Passageway 27 directs the extrusion material from entrance 26 to chamber 15. It should be noted that passageway 27 is a conventional double passageway and directs material down both sides of chamber 15. The extrusion material enters chamber 15 through chamber entrance 28.

*In Operation*

The extrusion material will be fed from the material supplying unit (not shown) of the extruding apparatus through conical passageway 23, outlet 24 and through passageway 27 into chamber 15. From chamber 15, the extrusion material will be forced through die 13 to form a sheath 39 about the wire 30. The wire 30 is fed through aperture 40 of core tube 18, spherical core guide 17 and the extrusion die 13. The spherical core guide 17 will rotate in sockets 16 and 38 to compensate for any eccentricity between the aperture 34 and the passageway 36 of extrusion die 13. The core guide rotates due to the pressure exerted on the core guide by the core as a result of eccentricity between the core guide and the orifice of the extrusion die. It should be noted that such adjustment of the core guide to compensate for eccentricity in no way affects the flow of extrusion materials through chamber 15. Due to the spherical shape of core guide 17, regardless of its position in chamber 15, substantially the same surface will be presented to the extrusion material. Therefore, the geometry of chamber 15 will remain symmetrical regardless of the position of core guide 17 in the sockets 16 and 38. It is, therefore, possible to automatically compensate for eccentricity of the core guide 17 with extrusion die 13 without disturbing the flow of the extrusion materials through the die. Further, as the core guide is permitted to move with the core, excessive wear on the core guide will be avoided.

It is to be understood that the above-described arrangements of apparatus and construction of elemental parts are simply illustrative of an application of the principles of the invention and many other modifications may be made without departing from the invention.

What is claimed is:

1. In an extruding device,
a symmetrical chamber having an extruding means at one end,
a spherical core guide for guiding a core through the extruding means, said spherical core guide having a bore therein formed by a conical socket ending in an aperture for accommodating the core, said conical socket receiving the conical tip of a core tube whereby the core is directed through the core tube and into the spherical core guide, and
means for positioning the spherical core guide to compensate for any eccentricity between the spherical core guide and the extruding means wherein due to the spherical shape of the core guide, the symmetry of the chamber remains unchanged as the spherical core guide is positioned.

2. In an extruding device,
a spherical core guide having a passage therethrough for a core,
an extrusion die,
a generally cylindrical member for holding and retaining the spherical core guide and an extrusion die,
a cylindrical adaptor having a transverse cylindrical bore for holding and retaining said cylindrical member, said cylindrical adaptor being threaded to a housing of an extrusion material supplying unit,
means provided in said cylindrical member for retaining said spherical core guide behind said extrusion die to form a symmetrical chamber within said cylindrical member between said extrusion die and said spherical core guide,
means provided on said core tube holder and said cylindrical member for permitting said spherical core guide to rotate freely within the chamber, and
a core tube threaded into said core tube holder and extending therefrom into the passage in the spherical core guide, the passage being sufficiently large to permit limited rotation of the guide about the extension of said core tube.

3. In an extruding device,
a spherical core guide,
an extrusion die,
means for retaining said spherical core guide behind said extrusion die so as to form a symmetrical chamber for directing extrusion material through said extrusion die, and
means for positioning the spherical core guide to compensate for any eccentricity between the spherical core guide and the extrusion die wherein due to the spherical shape of the core guide, the symmetry of the chamber remains unchanged as the spherical core guide is positioned.

References Cited in the file of this patent

FOREIGN PATENTS 1,037,697   Germany _____ Aug. 28, 1958